United States Patent [19]
Grözinger

[11] 3,975,966
[45] Aug. 24, 1976

[54] VARIABLE-SPEED DRILL

[75] Inventor: Dieter Grözinger, Echterdingen, Germany

[73] Assignee: Robert Bosch G.m.b.H., Stuttgart, Germany

[22] Filed: Dec. 11, 1974

[21] Appl. No.: 531,616

[30] Foreign Application Priority Data
Dec. 15, 1973  Germany............................. 2362432

[52] U.S. Cl..................................... 74/329; 74/333; 74/337
[51] Int. Cl.²........................ F16H 3/08; F16H 5/52
[58] Field of Search ............. 74/329, 322, 333, 337

[56] References Cited
UNITED STATES PATENTS

| | | | |
|---|---|---|---|
| 2,370,885 | 3/1945 | Sohm | 74/329 |
| 2,772,576 | 12/1956 | Ross | 74/337 |
| 2,861,460 | 11/1958 | Lips et al. | 74/322 X |
| 3,436,980 | 4/1969 | Loge et al. | 74/329 X |

*Primary Examiner*—Leonard H. Gerin
*Attorney, Agent, or Firm*—Michael J. Striker

[57] ABSTRACT

A housing accommodates a motor and a tool shaft which is to be driven by the same. A gear drive is interposed between the motor and the tool shaft and transmits power from the former to the latter. The gear drive has at least two gear sets providing different gear ratios, and an intermediate shaft. An axial safety coupling is associated with each of the gear sets and provided on the intermediate shaft to be rotatable with the same. Each safety coupling includes axially extending projections which are distributed about the axis of rotation of the intermediate shaft and which have circumferentially defined flanks. Each safety coupling has a diameter and a flank inclination at least one of which is accommodated to the torque generated by the gear ratio associated with the safety coupling. A biasing spring urges the projections of the safety couplings into engagement with one another.

8 Claims, 4 Drawing Figures

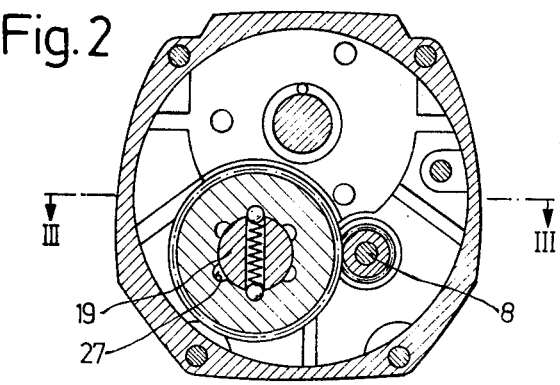
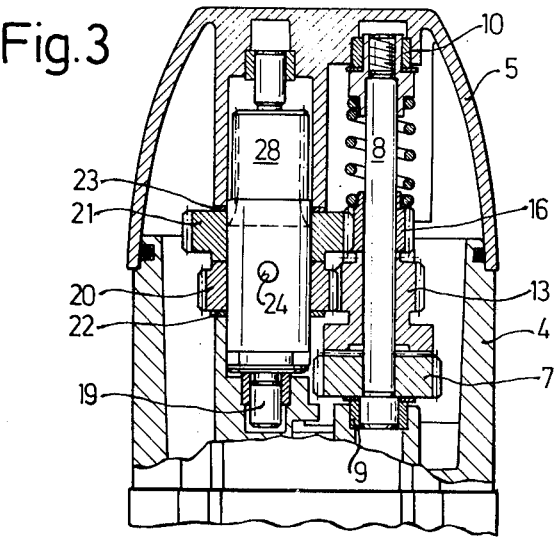
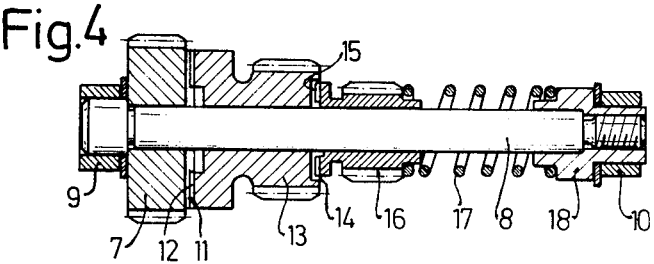

VARIABLE-SPEED DRILL

BACKGROUND OF THE INVENTION

The present invention relates generally to a drill, and more particularly to a variable-speed drill. Still more particularly, the invention relates to a hand-held variable-speed drill.

Drills of this type have safety couplings which are constructed as slip couplings and which transmit the motor torque via radial pressure to the tool spindle or output shaft. This type of construction is acceptable in certain drill equipment, namely drill equipment (mostly used for do-it-yourself applications) wherein the torque acting upon the tool spindle is on the order of 20–30 cmkp and wherein the safety coupling is not subjected to particularly heavy-duty requirements with respect to the frequency with which it must operate and the accuracy of the disengaging moment.

However, drills which are used commercially, that is in the industry, in crafts and the like, are usually of heavier-duty construction and transmit to the tool spindle a torque that is considerably higher than the one mentioned above. The torque is usually on the order of 90 cmkp and if such a torque were to be transmitted through a radial-pressure slip coupling as in the aforementioned types of constructions, the coupling would have to be excessively large. This, however, would then result in a loss of the advantages of that type of coupling, which are the inherently small dimensions and light weight. Moreover, the manufacturing expenses of such a coupling, which are small where the coupling is constructed to transmit relatively low torque on the order of 20–30 cmkp, would become acceptably high if it were to be constructed for transmitting the much higher torque of commerical equipment, because the manufacture of the cooperating cylindrical surfaces on the components of the coupling would require a great accuracy in manufacturing to obtain the desired accuracy of response for the coupling.

Other types of safety couplings are already known from the art, wherein surfaces which are inclined in circumferential direction of rotation of the coupled components are pressed against one another by appropriate biasing means, in order to transmit torque. However, if such a coupling would be used to directly drive the tool spindle of a drill of the type in question, the biasing springs required to enable the coupling to transmit the torque levels in question would have to be so strong and heavy that they could no longer be accommodated within the rather confined area no longer be accommodated within the confined area of the housing of a handheld drill. Moreover, if the drill is of the hammer-drill variety, the use of a safety coupling associated directly with the tool spindle would be impossible for all practical purposes.

For this reason the prior art has proposed to use this second type of coupling in connection with an intermediate shaft which rotates at higher speed than the tool spindle and which transmits a correspondingly lower torque. This prior art construction utilizes inclined coupling surfaces which are constructed as the flanks of axial claws or projections and which are pressed together by means of at least one spring. However, drills, using this tyoe of coupling arrangement have been found to have the disadvantage that while the coupling disengages in the desired manner, there will — depending upon the selected gear ratio — a large moment that will act upon the tool spindle at the levl of the disengaging torque in the smaller gear ratio, whereas in the higher gear ratio there will be a smaller moment acting at the tool spindle at the level of the disengaging torque. In other words, depending upon which of the variable-gear ratios is selected, the coupling will disengage when the tool spindle is subjected to a higher or a lower torque, respectively. Evidently, this is disadvantageous and required improvement.

SUMMARY OF THE INVENTION

Accordingly, it is a general object of the invention to provide such improvement.

More particularly, it is an object of this invention to provide an improved drill having a variable gear ratio which is not possessed of the aforementioned disadvantages.

Still more specifically, it is an object of the invention to provide such an improved drill wherein the safety coupling will disengage whenever the torque acting upon the tool spindle reaches substantially the same level, irrespective of whether the drill is being operated in a high-speed or a low-speed mode.

In keeping with these objects, and with others which will become apparent hereafter, one feature of the invention resides in a variable-speed drill which, briefly stated, comprises a housing, a motor in the housing, and a tool shaft which is to be driven in rotation by the motor. A gear drive is interposed between the motor and the tool shaft and transmits power from the former to the latter. The gear drive has at least two gear sets providing different gears ratios and an intermediate shaft. An axial safety coupling is associated with each of the gear sets and provided on the intermediate shaft, being rotatable with the same. Each safety coupling includes axially extending projections which are distribued about the axis of rotation of the intermediate shaft and have circumferentially inclined flanks. Each safety coupling has a diameter and flank inclination at least one of which is accommodated to the torque generated by the gear ratio associated with the safety coupling. Biasing means urges the projections of the safety couplings into engagement with one another.

The novel features which are considered as characteristic for the inventiond are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a section on line II—II of FIG. 1;

FIG. 3 is a section on line III—III of FIG. 2; and

FIG. 4 is a side view, showing the intermediate shaft and safety couplings of FIG. 3 on an enlarged scale.

DESCRIPTION OF THE PREFERRED EMBODIMENTS

Figure 1:
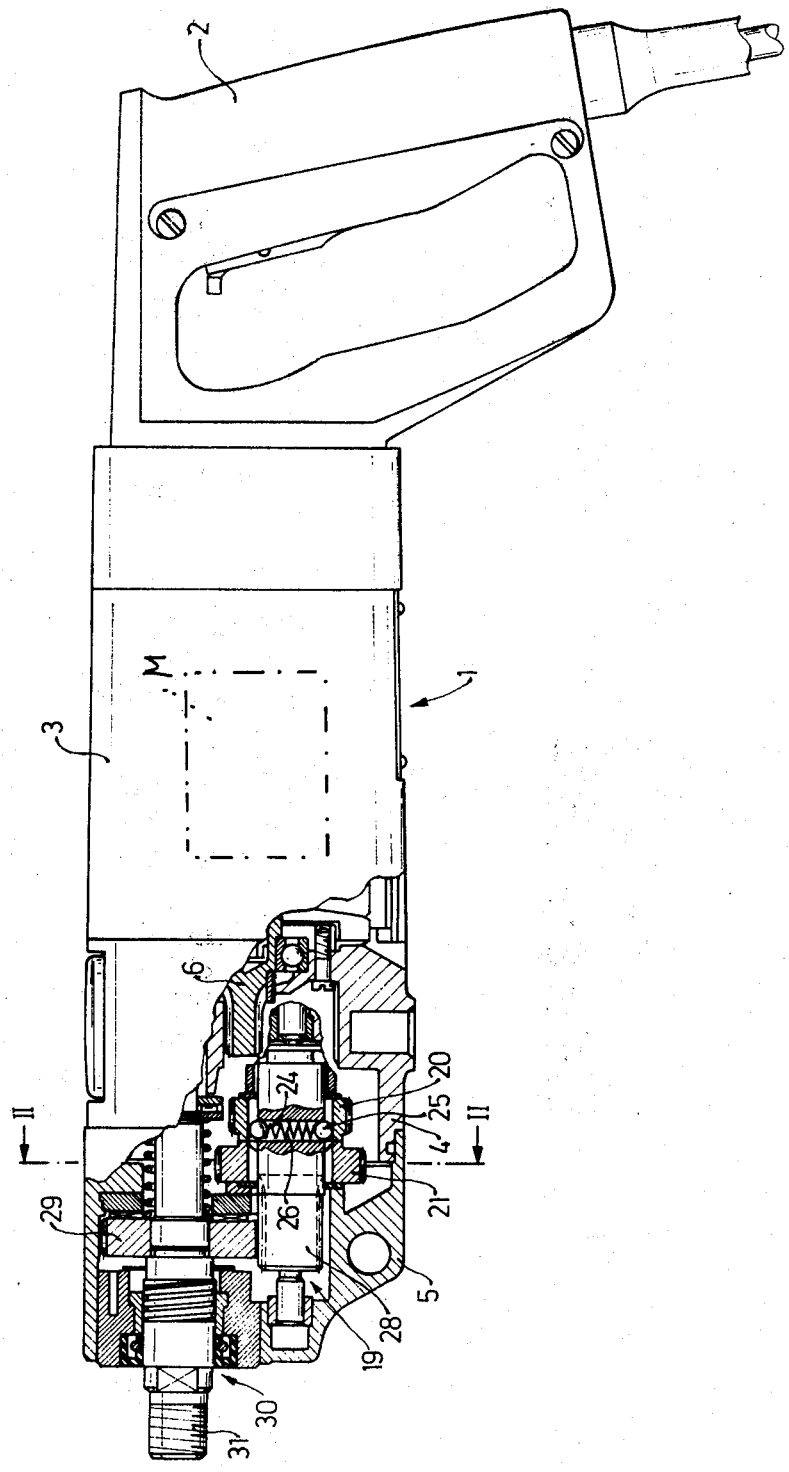
FIG. 1 is a side view of a hammerdrill according to the present invention, partly in section.

The exemplary variable-speed hammerdrill 1 shown in FIGS. 1–4 has a handgrip 2, a motor housing 3, a drive gear housing 4 and a housing 5 which accommodates the hammering device of the drill; these housings are connected together in appropriate manner, for example by means of not illustrated screws or bolts.

The drive motor is not shown but is of course electrical and drives a pinion 6 which engages with a gear 7. The latter is mounted fixedly on a first intermediate shaft 8 which is journalled by means of one bearing 9 in the housing 4 and by means of another bearing 10 in the housing 5. At the endface of the gear 7 which faces away from the bearing 9 the gear is provided with an annulus of inclined projections or claws 11, which mesh with cooperating inclined projections or claws 12 that are formed on a gear 13 (or rigidly connected with the same) which is mounted with freedom of rotation and axial shifting on the intermediate shaft 8. The opposite axial end of the gear 13 remote from the projections 12 is provided with a second annulus of inclined projections or claws 14 which meshes with a corresponding annulus of claws or projections 15 that is provided on a gear 16 which is also rotatable and shiftable on the shaft 8. A helical spring 17 acts as an expansion spring and bears against the axial end of the gear 16 which is remote from the projections 15. In the region of the bearing 10 a support bearing 18 is mounted on the shaft 8, and the end of the spring 17 which is remote from the gear 16 bears upon the bearing 18.

At the level of the first intermediate shaft 8 there is provided a second intermediate shaft 19 the one end of which is mounted on the housing 8 and the other end of which is mounted on the housing 5. The intermediate shaft 19 is turnable and longitudinally shiftable and carries two gears 20 and 21 which are rotatable and can be shifted relative to the shaft 19. The gears 20 and 21 are retained by members 22 and 23 against shifting movement with reference to the housings 4 and 5. In the region of the gears 20 and 21 the shaft 19 has a transverse bore 24 which accommodates two balls 25 that are forced outwardly apart by a spring 26. The hub bores of the gears 20 and 21 are formed with a plurality of axially extending grooves 27 of semi-cylindrical cross section which corresponds to the diameter of the balls 25. The shaft 19 can be shifted relative to the housings between a forward end position and a rearward end position; the means for this purpose are well known and therefore need not be described. When the shaft is in the respective end positions one or the other of the gear ratios is thereby selected. The bore 24 is then located either within the gear 20 or within the gear 21, and the balls 25 snap into respective grooves 27 either of the gear 20 or the gear 21 so that they thereby connect the respective gear 20 or 21 with the shaft 19 for rotation with the latter.

In the region of the front end (the left end in FIG. 1) the shaft 19 is formed as a pinion 28, or provided with one, which meshes with a gear 29 that is fixedly mounted on a tool spindle 30 which is journalled for rotation in the housings 4 and 5. The outward end of the tool spindle 30 carries a thread 31 onto which a chuck or the like may be threaded.

The construction illustrated in the exemplary embodiment provides for the selection of two gear ratios, so that the dril is a two-speed drill. The drive train of the first gear ratio with the highest transmission ratio and the greatest torque acting on the tool spindle 30 extends from the motor pinion 6 via the gear 7 to the gear 13 and the gear 16, from there via the gear 21 to the shaft 19, the pinion 28 and the gear 29 and thus to the tool spindle 30. The drive train of the second gear ratio having the smaller transmission and the lower torque acting upon the tool spindle, but rotating at a higher speed, leads from the motor pinion 6 via the gear 7 to the gear 13, the gear 20, the shaft 19, the pinion 28 and the gear 29 and finally to the spindle 30.

The safety coupling illustrated in this embodiment is bipartite, corresponding to the two gear ratios. The diameter of the coupling 11, 12 for the second speed ratio is approximately twice that of the coupling 14, 15 for the first speed ratio. This assures that the disengaging moment of the coupling 11, 12 is approximately twice that of the coupling 14, 15. Since the first speed ratio is approximately twice as great as the second ratio, the torque acting upon the tool spindle at the moment of disengagement of the safety coupling will be approximately identical in both instances. With this diameter ratio relationship of the couplings 11, 12 and 14, 15 the flanks of the axial projections of the couplings 11, 12 and 14, 15 have identical inclinations.

However, it is also possible to make the diameters of the two couplings identical but then to provide the flanks of the projections of the coupling 11, 12 with a lesser inclination than the flanks of the other coupling 14, 15.

When the first gear ratio is selected, the torque travels through both couplings 11, 12 and 14, 15, and when the torque exceeds the preselected level at which the safety coupling is to disengage, the coupling 14, 15 becomes disengaged because it is constructed for a lower torque. In the second ratio the gear for the first speed ratio and the associated safety coupling 14, 15 turn in an idling movement. and only the coupling 11, 12, for the second ratio transmits the torque and acts when the predetermined torque level is exceeded.

The arrangement according to the prsent invention can be used with drills having not only two selectable speeds, but having more than two selectable speeds. In this case the gear 13 engages via the coupling 11, 12 not the gear 7 but a gear for the third speed ratio which then in turn engages via a safety coupling the gear 7 driving the intermediate shaft 4.

It will be understood that each of the elements described above, or two or more together, may also find a useful applicaton in other types of constructions differing from the types described above.

While the invention has been illustrated and described as embodied in a variable-speed drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A variable-speed drill, comprising a housing; a motor in said housing; a tool shaft which is to be driven in rotation by said motor; a gear drive interposed between said motor and said tool shaft and transmitting power from the former to the latter, said gear drive having an intermediate shaft and at least two gear sets providing different selectable gear ratios so that said tool shaft is driven at different speeds and subject to different torques in dependence upon which of said gear ratios is selected; and safety coupling means coupling said intermediate shaft with said tool shaft and operative for uncoupling said shafts from one another at a predetermined torque level which is substantially the same irrespective of which of said gear ratios is selected for driving said tool shaft in rotation.

2. A drill as defined in claim 1, said safety coupling means comprising an axial safety coupling associated with each of said gear sets and provided on said intermediate shaft, rotatable with the same and each including axially extending projections which are distributed about the axis of rotation of said intermediate shaft and have circumferentially inclined flanks, each safety coupling having a diameter and flank inclination at least one of which is accommodated to the torque generated by the gear ratio associated with the safety coupling; and biasing means urging the projections of said safety couplings into engagement with one another.

3. A drill as defined in claim 2, wherein said biasing means comprises a single spring which acts upon all of said safety couplings.

4. As drill as defined in claim 3, wherein said intermediate shaft includes a support bearing, and one of said gear sets includes a first gear; and wherein said spring is an expansion spring which bears upon said support bearing and said first gear, respectively.

5. A drill as defined in claim 4, the other of said gear sets having a second gear; and wherein one of said safety couplings is interposed between and cooperates with said first and second gears.

6. A drill as defined in claim 5, wherein said gear drive includes a drive gear which drives said intermediate shaft in rotation; and wherein another of said safety couplings is interposed between and cooperates with said second gear and said drive gear.

7. A drill as defined in claim 6, wherein said safety couplings have their projections formed on axial ends of the respective first, second and drive gears.

8. A drill as defined in claim 2, wherein said axial projections of said safety couplings interdigitate with one another.

* * * * *